Dec. 11, 1951     D. W. WINDUS     2,577,941
CHUCK

Filed Jan. 19, 1946     2 SHEETS—SHEET 1

Inventor
D. W. WINDUS
By Rule and Hoge,
Attorneys

Dec. 11, 1951     D. W. WINDUS     2,577,941
CHUCK

Filed Jan. 19, 1946     2 SHEETS—SHEET 2

Inventor
D. W. WINDUS
By Rule and Hoge,
Attorneys

Patented Dec. 11, 1951

2,577,941

UNITED STATES PATENT OFFICE 2,577,941

CHUCK

Donald W. Windus, Streator, Ill., assignor to Owens-Illinois Glass Company, a corporation of Ohio Application January 19, 1946, Serial No. 642,244

7 Claims. (Cl. 279—32)

My invention relates to chucks for holding bottles or other articles or workpieces. The invention, in the form herein illustrated, is particularly adapted for holding bottles or other containers during certain tests applied to the containers as, for example, tests for resistance to internal pressure. In certain testing machines now in use used for said purpose, chucks are provided for holding the articles during the tests; the chuck being designed to be opened and closed by the operator, one hand being used for placing and removing the articles while the chuck is closed and opened with the other hand. The rate at which the articles are tested is determined largely by the time required for placing the articles and operating the chuck. An object of the present invention is to provide a chuck so constructed that it is closed automatically by the article itself as the latter is moved into position for the test and opened automatically by withdrawing the article. The use of such self-operating chuck leaves both hands of the operator free for placing and removing the articles and thus permits the articles to be tested in rapid succession.

A further object of the invention is to provide a simplified form of chuck with a comparatively small number of operating parts and to thereby reduce wear and cost of upkeep.

Further objects of the invention will appear hereinafter.

Referring to the accompanying drawings.

Figure 1:
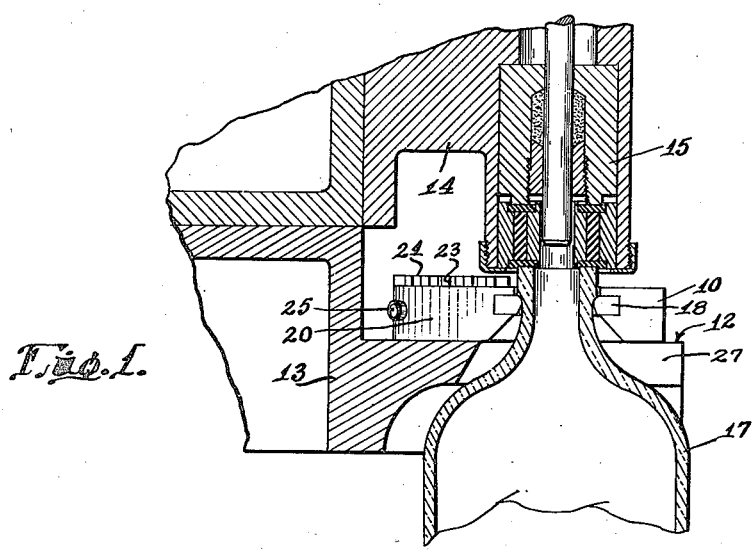
Fig. 1 is a fragmentary sectional elevation of a bottle testing machine, showing a testing head and the chuck for holding the bottle during the testing, the section being taken at the line 1—1 on Fig. 5.

The chuck in the preferred form herein shown, comprises a pair of jaws 10 in the form of substantially rectangular flat metal plates. The jaws are pivotally mounted, by means of pivot bolts 11, on the horizontal flat surface 12 of a support 13 which as herein shown is the machine base of a bottle testing machine. The machine may comprise a carriage 14 mounted for rotation about a vertical axis and carrying a series of testing heads 15 which are brought in succession to the testing station and arrested in position for testing articles held in the chuck.

Figure 2:
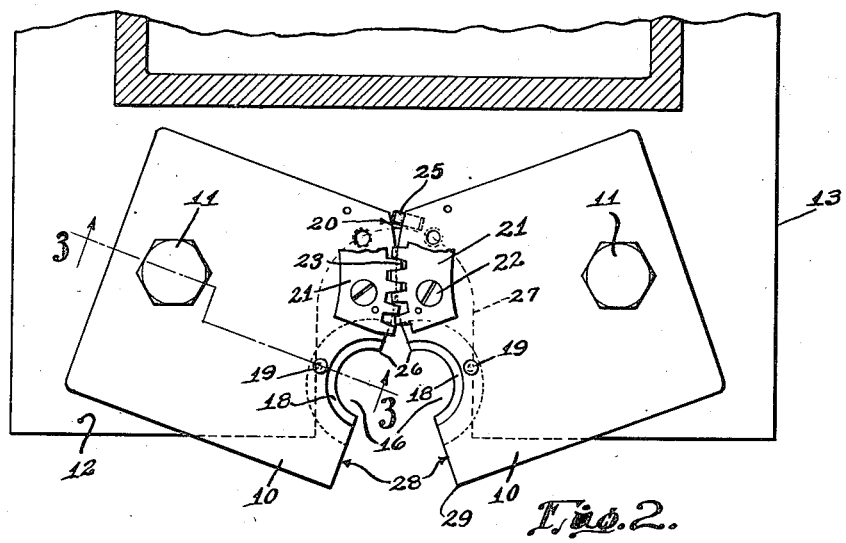
Fig. 2 is a sectional plan view showing the chuck in open position.
Figure 3:
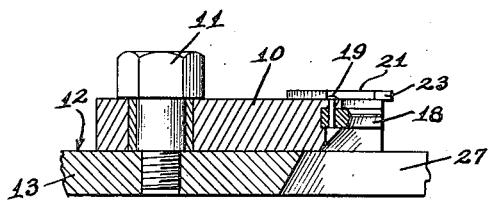
Fig. 3 is a section at the line 3—3 on Fig. 2.
Figure 5:
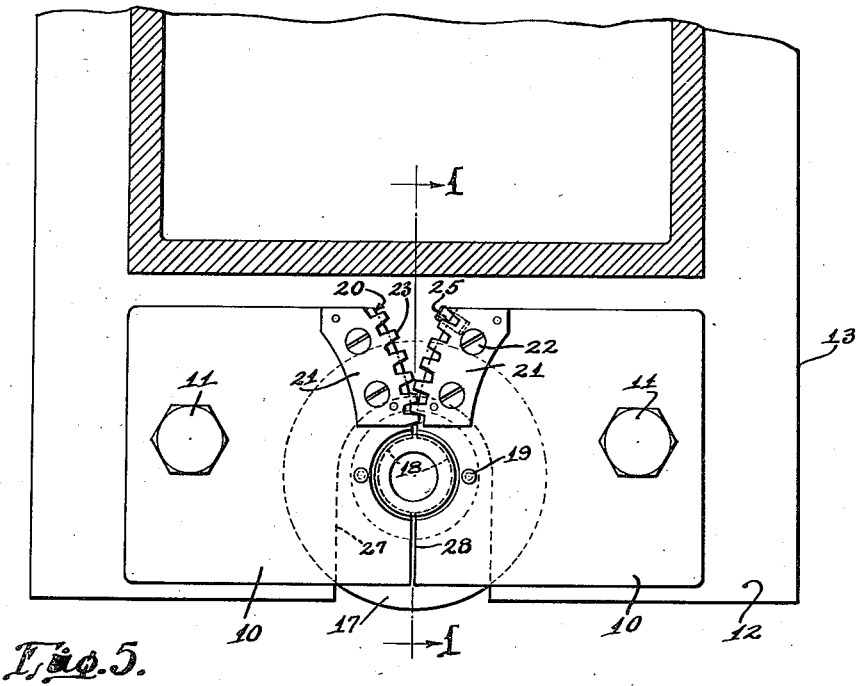
Fig. 5 is a view similar to Fig. 4, but showing the chuck closed.
Figure 4:
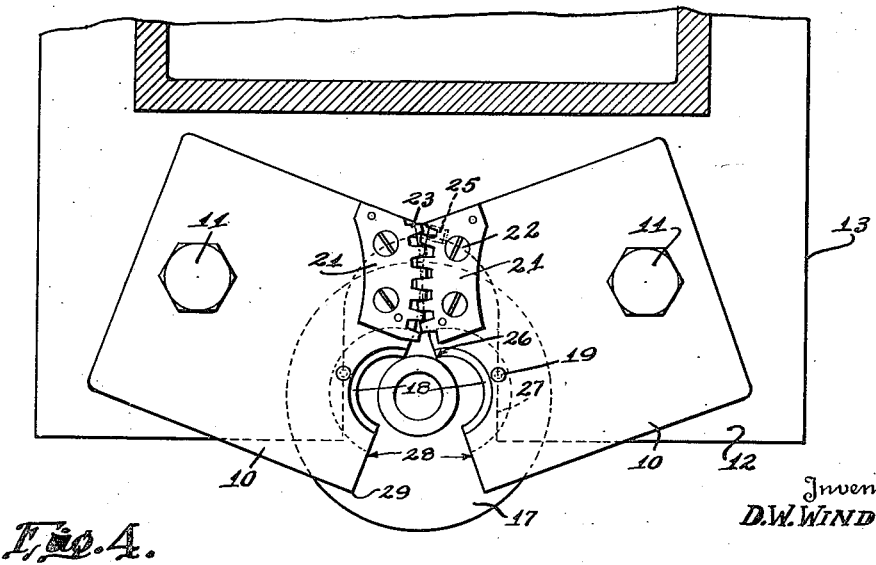
Fig. 4 is a view similar to Fig. 2 but showing a bottle in the open chuck.

The jaws 10 are formed with semi-circular recesses 16 or cut-away portions to provide a circular opening in which the neck of the bottle 17 or other workpiece is held when the jaws are closed. Semi-circular gaskets 18 are fitted within said recesses and are secured in place by pins 19 or other holding means. The gaskets may be made of metal or other material suitable for contacting the articles under test. The adjacent end faces of the plates 10 include arc-shaped surfaces 20 concentric with the pivots 11, said surfaces extending rearwardly from the chuck opening. As shown, the arc-shaped surfaces are in rolling contact. Arc-shaped rack bars 21 or gear segments are mounted on the plates 10 with their pitch lines in register with the arc-shaped surfaces 20, and are attached to the plates 10 by screws 22. The gear segments are formed with intermeshing gear teeth 23 and serve as a positive means for insuring the movement of the holding jaws in unison. The opening movement of the jaws is limited by a stop pin 25 mounted in one jaw in position to engage the other jaw when the jaws have been opened to the predetermined limit. As shown in Fig. 2, the jaws, when in open position, are spaced apart at the forward ends of the gaskets 18, a distance somewhat greater than the diameter of the chuck opening, thereby permitting the bottles or other workpieces to move freely into position between the jaws. The spacing between the rear ends of the gaskets, namely, at the points 26, is comparatively narrow so that when the bottle is placed in position between the open jaws, as shown in Fig. 4, it contacts the jaws at said points and as the bottle is pushed rearwardly, swings the jaws into the closed position (Fig. 5). It will be noted that the bottle can be placed in position and the jaws closed therearound, simply by a single movement of the bottle while held in one hand by the operator. The bottle is then held by the chuck during the testing operation and after the test is completed the chuck is opened and the bottle removed simply by pulling the bottle forwardly. The machine base 13 is formed with a recess or opening 27 of a size and shape to permit the workpieces to be placed in position between the jaws of the chuck.

The adjacent end surfaces of the plates 10 includes straight flat vertical sections 28 extending rearwardly from the front corners 29 of the plates to the gaskets 18 or workholding surfaces, the surfaces 28 being outwardly flared while the jaws are in open position. They serve as guiding surfaces for the articles being placed in the chuck.

By reference to Fig. 5, it will be seen that while the jaws 10 are in closed position, the circular opening formed by the recesses 16 is positioned just forward of the center line joining the axes of the pivots 11, the center line being about tangent to the circle of said opening. The general direction of movement of the semi-circular recesses 16 is toward and from the center line, said recesses remaining forward of the center line throughout such movement. The mean direction of movement of said recesses is perpendicular to said center line.

Modifications may be resorted to within the spirit and scope of my invention.

I claim:

1. A chuck comprising a pair of jaws in the form of flat plates, a frame base on which said plates are supported, pivot pins connecting said plates to said base and on which said plates are pivoted for swinging movement to and from a closed position, said plates when in closed position having adjoining edges formed with recesses which together form a circular opening to receive a workpiece, the said pivot pins being spaced apart a substantially greater distance than the said recesses when the jaws are in their wide open position and said recesses being positioned to move toward the center line joining the pivot pins, during the movement of the plates to closed position, and thereby bringing the circular opening close to the said center line when the closed position is reached, and intermeshing gear segments attached to said plates.

2. A chuck comprising a pair of jaws in the form of flat plates, a frame base on which said plates are supported, pivot pins connecting said plates to said base and on which said plates are pivoted for swinging movement to and from a closed position, said plates when in closed position having adjoining edges formed with recesses which together form a circular opening to receive a workpiece, the said pivot pins being spaced apart a substantially greater distance than the said recesses when the jaws are in their wide open position and said recesses being positioned to move toward the center line joining the pivot pins, during the movement of the plates to closed position, and thereby bringing the circular opening close to the said center line when the closed position is reached, intermeshing gear segments attached to said plates concentrically with said pivots, and a stop carried by one said plate in position to contact the other plate when said plates are swung to open position.

3. A chuck comprising a pair of jaws in the form of flat plates, a base having a flat surface on which the plates are supported for swinging movement to and from a closed position, pivots connecting the plates to said base, said plates having adjacent end surfaces including semi-circumferential recessed sections intermediate the front and rear ends of said end surfaces, said recessed sections forming a circular opening for receiving a workpiece, said end faces comprising arc-shaped portions commencing at and extending rearwardly from said recessed sections concentrically with the pivots, the arc-shaped portions of the said end surfaces being in rolling contact, arc-shaped gear segments mounted on said plates concentrically with said pivots and having intermeshing gear teeth, said gear segments extending along said arc-shaped portions of the plates, said end faces comprising substantially straight portions extending forwardly from the said recessed sections to the forward edges of the plates, said forwardly extending portions, when the jaws are open, being spaced apart where they join said recessed sections, a distance at least equal to the diameter of said circular opening, the said end faces of the plates being spaced at the rear ends of the said arc-shaped openings a distance substantially less than the diameter of said circular opening while the jaws are at open position, and a stop positioned to limit the opening movement of the jaws and determine said open position thereof, the said pivots being spaced apart a substantially greater distance than the front edges of said end faces of the plates when the jaws are fully open.

4. A chuck comprising a pair of jaws, a frame base on which the jaws are supported, pivot pins connecting said jaws to said base and on which the jaws are pivoted for swinging movement on said base about fixed pivot points, to and from a closed position, said jaws extending inwardly from the pivots toward each other and being formed with semi-circular recesses at their inner ends forming workholding surfaces and, when the jaws are in closed position, forming a substantially circular opening, said recesses being positioned, throughout the swinging movement of the jaws, at one side of the center line joining the pivots, the pivot pins being spaced apart approximately double the distance between each said pin and the center of the circular opening, whereby the general direction of movement of each said recess is approximately perpendicular to said center line.

5. A chuck comprising a pair of jaws, a frame base on which the jaws are supported, pivot pins connecting said jaws to said base and on which the jaws are pivoted for swinging movement on said base about fixed pivot points, to and from a closed position, the pivot pins being spaced apart a distance substantially greater than the length of either jaw, said jaws extending inwardly from the pivots toward each other and being formed with semi-circular recesses at their inner ends forming workholding surfaces and, when the jaws are in closed position, forming a substantially circular opening, said recesses being positioned, throughout the swinging movement of the jaws, at one side of the center line joining the pivots, the center line being about tangent to the circular opening when the jaws are in closed position, the outer edges of the semi-circular recesses, when the jaws are in open position, being spaced apart a greater distance than the diameter of the opening and the opposite edges of the said recesses being spaced apart a substantially less distance than said diameter when the jaws are in open position.

6. A chuck comprising a pair of jaws, a frame base on which the jaws are supported, pivot pins connecting said jaws to said base and on which the jaws are pivoted for swinging movement on said base about fixed pivot points, to and from a closed position, said jaws extending inwardly from the pivots toward each other and being formed with semi-circular recesses at their inner ends forming workholding surfaces, and when the jaws are in closed position, forming a substantially circular opening, said recesses being positioned, throughout the swinging movement of the jaws, at one side of the center line joining the pivots, the pivot pins being spaced apart approximately double the distance between each said pin and center of the said circular opening, whereby the general direction of movement of each said recess is approximately perpendicular to said center line, said jaws having arc-shaped surfaces concentric with the pivots and maintained in rolling contact during the swinging movement of the jaws, and intermeshing gear segments mounted on the jaws with their pitch lines registering with said arc-shaped surfaces.

7. A chuck comprising a pair of jaws, a base on which the jaws are supported and pivoted for horizontal swinging movement about fixed vertical axes to and from a closed position, said jaws extending inwardly from their pivots and formed at their inner ends with semi-circular recesses for engaging a workpiece and providing a circular opening when the jaws are in closed position, the diameter of said opening being less than the distance between a said recess and its pivot, the distance between the said pivots being approximately double the distance between either pivot and the center of said circular opening, said recesses being maintained on one side of the center line joining said pivots, throughout the movement of the jaws to and from closed position.

DONALD W. WINDUS.

REFERENCES CITED

The following references are of record in the file of this patent:

UNITED STATES PATENTS

| Number | Name | Date |
| --- | --- | --- |
| 1,217,087 | George | Feb. 20, 1917 |
| 1,648,030 | Roedding | Nov. 8, 1927 |
| 2,217,072 | Nixon | Oct. 8, 1940 |
| 2,325,978 | Pityo | Aug. 3, 1943 |